(12) United States Patent
Zettl et al.

(10) Patent No.: US 11,027,979 B2
(45) Date of Patent: Jun. 8, 2021

(54) PROCESS FOR HYDROGENATING SILICON TETRACHLORIDE

(71) Applicant: WACKER CHEMIE AG, Munich (DE)

(72) Inventors: Martin Zettl, Burghausen (DE); Andreas Hirschmann, Ering (DE); Uwe Pätzold, Burghausen (DE); Robert Ring, Haiming (DE)

(73) Assignee: WACKER CHEMIE AG, Munich (DE)

(*) Notice: Subject to any disclaimer, the term of this patent is extended or adjusted under 35 U.S.C. 154(b) by 29 days.

(21) Appl. No.: 16/463,242

(22) PCT Filed: Nov. 23, 2016

(86) PCT No.: PCT/EP2016/078600
§ 371 (c)(1),
(2) Date: May 22, 2019

(87) PCT Pub. No.: WO2018/095525
PCT Pub. Date: May 31, 2018

(65) Prior Publication Data
US 2019/0322534 A1    Oct. 24, 2019

(51) Int. Cl.
*C01B 33/107* (2006.01)
(52) U.S. Cl.
CPC ............... *C01B 33/1071* (2013.01)
(58) Field of Classification Search
CPC .............................................. C01B 33/1071
See application file for complete search history.

(56) References Cited

U.S. PATENT DOCUMENTS

| | | | |
|---|---|---|---|
| 4,454,104 A | 6/1984 | Griesshammer et al. | |
| 4,536,642 A | 8/1985 | Hamster et al. | |
| 4,542,004 A * | 9/1985 | Sarma | C01B 33/1071 |
| | | | 204/164 |
| 5,422,088 A | 6/1995 | Burgie et al. | |
| 2004/0047793 A1 | 3/2004 | Mleczko et al. | |
| 2007/0073075 A1 | 3/2007 | Paetzold et al. | |
| 2012/0327543 A1 | 12/2012 | Ellinger et al. | |
| 2013/0224098 A1 | 8/2013 | Latoschinski et al. | |
| 2014/0105805 A1 | 4/2014 | Haeckl et al. | |

(Continued)

FOREIGN PATENT DOCUMENTS

| DE | 3139705 A1 | 4/1983 |
|---|---|---|
| DE | 19502550 B4 | 8/1995 |

(Continued)

OTHER PUBLICATIONS

English Abstract corresponding to WO 2015140027 A1.

*Primary Examiner* — Ngoc-Yen Nguyen
(74) *Attorney, Agent, or Firm* — Brooks Kushman P.C.

(57) ABSTRACT

The invention relates to a process for hydrogenating silicon tetrachloride in a reactor, wherein a reactant gas containing hydrogen and silicon tetrachloride is heated to a temperature between 850° C. and 1600° C. by means of at least one heating element, which comprises a graphite surface, wherein the temperature of the heating element is between 850° C. and 1600° C. The process is characterized in that a nitrogen compound is added to the reactant gas in a substance amount fraction of 0.1 to 10% based on hydrogen.

18 Claims, 6 Drawing Sheets

(56) References Cited

U.S. PATENT DOCUMENTS

2014/0170050 A1 6/2014 Knoth et al.
2016/0374144 A1* 12/2016 Zalar .................. H05B 3/145

FOREIGN PATENT DOCUMENTS

| DE | 102010039267 A1 | 2/2012 |
| DE | 102011077967 A1 | 12/2012 |
| DE | 102012218741 A1 | 4/2014 |
| EP | 1775263 A1 | 4/2007 |
| EP | 2000434 A2 | 12/2008 |
| EP | 2746222 A1 | 6/2014 |
| WO | 2013116146 A1 | 8/2013 |
| WO | 2015140027 A1 | 9/2015 |

* cited by examiner

PROCESS FOR HYDROGENATING SILICON TETRACHLORIDE

CROSS-REFERENCE TO RELATED APPLICATIONS

This application is a U.S. National Phase Application of PCT/EP2016/078600, filed Nov. 23, 2016 the contents of which is incorporated herein by reference in its entirety for all purposes.

FIELD OF THE INVENTION

The invention relates to a process for hydrogenating silicon tetrachloride (STC).

STC is obtained, in particular, in the deposition of polycrystalline silicon. Polycrystalline silicon is, for example, produced by means of the Siemens process. Here, silicon is deposited on heated thin rods in a reactor. As process gas, a halosilane such as trichlorosilane (TCS) in the presence of hydrogen is used as silicon-containing component. In general, large amounts of STC are formed thereby as by-product.

BACKGROUND OF THE INVENTION

The preparation of TCS usually proceeds from metallurgical silicon and hydrogen chloride in a fluidized-bed process. In order to produce high-purity trichlorosilane, a distillation is generally carried out afterward. Here, STC is also obtained as by-product.

The economically most interesting utilization of STC is usually conversion into TCS. This is effected by hydrogenation of STC by means of hydrogen to give TCS and hydrogen chloride. This makes it possible to recycle the STC in a circular process and pass the TCS obtained to, for example, the production process for polycrystalline silicon.

The conversion of STC into TCS by means of hydrogen usually takes place at high temperatures of at least 600° C., in particular at least 850° C. (high-temperature conversion). Heating elements are necessary for heating the gaseous starting materials to the reaction temperature and introducing the endothermic energy of reaction. The heating of the starting materials can in principle be carried out by various methods, for example by means of induction heating elements or by means of electric resistance heating elements. Resistance heating elements in particular are practicable and therefore widespread in the high-temperature conversion.

To achieve very efficient energy utilization, the gaseous starting materials for the reaction (STC and hydrogen) are usually heated by means of heat exchangers using hot offgases from the reactor, which comprise mainly TCS, hydrogen chloride, STC and hydrogen.

Reactors for the hydrogenation of STC by means of hydrogen generally have to be able to withstand the high temperatures and the corrosive nature of chlorosilanes and hydrogen chloride which are formed during the hydrogenation. For this reason, materials based on carbon, including carbon, graphite, carbon fiber composites and the like, are typically used as materials of construction within the reactor.

At high temperatures, components based on carbon react with hydrogen to form methane (methanation). This can lead to structural defects in the reactor and ultimately to reactor failures. The operating life of the reactor can be reduced in this way. The replacement of defective parts by new parts is generally as with a considerable financial outlay.

Methanation can, in particular, occur at the heating elements which come into direct contact with hydrogen and STC. The heating elements generally consist of graphite or comprise at least a graphite surface. In addition, heat exchangers based on carbon can also be damaged at relatively high temperatures by reaction of hydrogen present in the offgas to form methane. This can result in loss of material and thus to structural defects on the components. Heating elements made of graphite in particular display the greatest susceptibility to corrosion since hydrogen can here come into contact with the hot surfaces of the heating elements. Damage to the heating elements generally leads to the reactor going down, since the flow of current for the required power input usually has to be interrupted.

DE 195 02 550 B4 proposes separating the heating elements for a reactor from the hydrogen-containing reaction gas by means of a dividing wall. As a result, the heating elements do not come into contact with heated hydrogen. The methanation reaction at the heating elements can thus be prevented. However, corrosive attack by hydrogen gas on other surfaces based on carbon cannot be prevented.

EP 2 000 434 A2 discloses an apparatus for the conversion of STC, in which the heating elements are arranged separately from the reaction space. A space between reaction space and outer reactor container is supplied with argon under superatmospheric pressure in order to prevent leakages to the outside. Here, the heating elements are not in contact with hydrogen, so that corrosion can be avoided. However, the heat exchangers used come into contact with hydrogen.

A substantial disadvantage of the known methods is that, due to the greater distance from the heating elements to the reaction space, a significantly higher temperature of the heating elements is required in order to introduce the necessary power. As a result, a greater outlay in terms of the insulation of the heating space in which the heating elements are arranged is in principle required. In general, the additional insulation also increases the diameter of the plant. Furthermore, the heating space usually has to be provided with complicated pressure regulation so as to ensure that the pressure in the heating space is greater than the pressure in the reaction space. This is intended to prevent hydrogen from getting into the heating space. A further disadvantage of the known methods can be that only the heating elements but not the heat exchangers are protected against corrosion.

Should damage to the shell enclosing the heating space occur, for example by corrosion or by means of cracks due to thermal stress, the inert gas can flow out from the heating space into the reaction space due to the higher pressure. This generally leads to contamination of the reaction space and can have an adverse effect on the product quality, In principle, the separation of reaction space and heating space requires a high outlay in terms of construction and incurs higher production and maintenance costs.

EP 1 775 263 A1 proposes coating the surface of a reaction space and the surface of the heating elements in-situ with silicon carbide (SiC) before the hydrogenation of STC in order to prevent methanation. Coating takes place at a temperature of at least 1000° C.

However, it has been found that materials coated with SiC or silicon nitride (SiN) are not completely protected against corrosion by hydrogen and/or hydrogen chloride. Temperature changes, in particular during start-up but also during the process, can lead to cracks in the coating even in the case of only minimal differences between the coefficients of thermal expansion of the coating and the base material of the heating elements. At these places, the base material is unprotected against corrosion. Such coating, in particular in the case of heat exchangers, is also usually associated with a considerable financial outlay.

It is disclosed in WO 2015/140027 A1 that introduction of carbon-containing compounds together with the starting materials STC and hydrogen reduces chemical attack on, in particular, SiC or SiC-containing materials. The life of SiC components can be increased in this way. The increased concentrations of volatile carbon compounds can have adverse effects since they accelerate the formation of organochlorosilanes and the latter have to be separated off from the product in a complicated manner.

DE 10 2012 2113 741 A1 discloses a process for converting STC into TCS, in which damage to SiC-coated heating elements can be significantly reduced by introduction of boron compounds. This is confirmed by the course of the electrical resistance of the heating elements over time. The stable resistance of the heating elements over a prolonged time indicates that no further damage occurs. The precise mechanism of this effect is not known. Distribution of the boron compound in the system could have adverse effects, which can lead to an increased outlay in the purification of the product.

WO 2013/116146 A1 describes a process for applying SiC and SiN layers or mixed phases thereof to graphite components without removing the latter from the reactor. For this purpose, polycarbosilanes or polysilazanes or a mixture thereof are/is applied to the components before commencement of the process and hardening is carried out in a preceding step, in which the ceramic layers are formed in order to passivate and repair the components.

The process results in some disadvantages; among other things, the layers formed by means of hardening are not completely gastight. Damage due to chemical attack by hydrogen or hydrogen chloride can continue to occur. In order to ensure complete gastightness, multiple application of the SiC and/or SiN layers is necessary. The plant availability is reduced thereby.

In reactors for the conversion of STC into TCS, graphite is preferably used as material for heat exchangers, heating elements and for conduction of flow. Graphite is particularly suitable because of its thermal stability, thermal conductivity, electrical conductivity and processing properties. However, at relatively high temperatures and in the presence of hydrogen, the undesirable methanation reaction can occur. The rate of this reaction increases with temperature.

In order to prevent the methanation reaction, attempts are made to coat the graphite components used with suitable materials or to use ceramics. Furthermore, attempts have been made to passivate components which are susceptible to a methanation reaction by blanketing with inert gases.

However, the proposed solutions cannot solve the problem satisfactorily since they increase the engineering outlay, lead to undesirable energy losses and also reduce the availability of the plants and the specific product output (space-time yield).

BRIEF SUMMARY OF THE INVENTION

These problems gave rise to the object of the present invention, namely to provide a process for the hydrogenation of STC in which methanation at unpassivated, hot surfaces is prevented or at least slowed in an is way.

The object of the invention is achieved by a process hydrogenating STC in a reactor, in which a feed gas containing hydrogen and STC is heated to a temperature in the range from 850° C. to 1600° C. by means of at least one heating element which comprises a graphite surface, with the temperature of the heating element being in the range 850° C. to 1600° C.

DETAILED DESCRIPTION OF PREFERRED EMBODIMENTS

Figure 1:
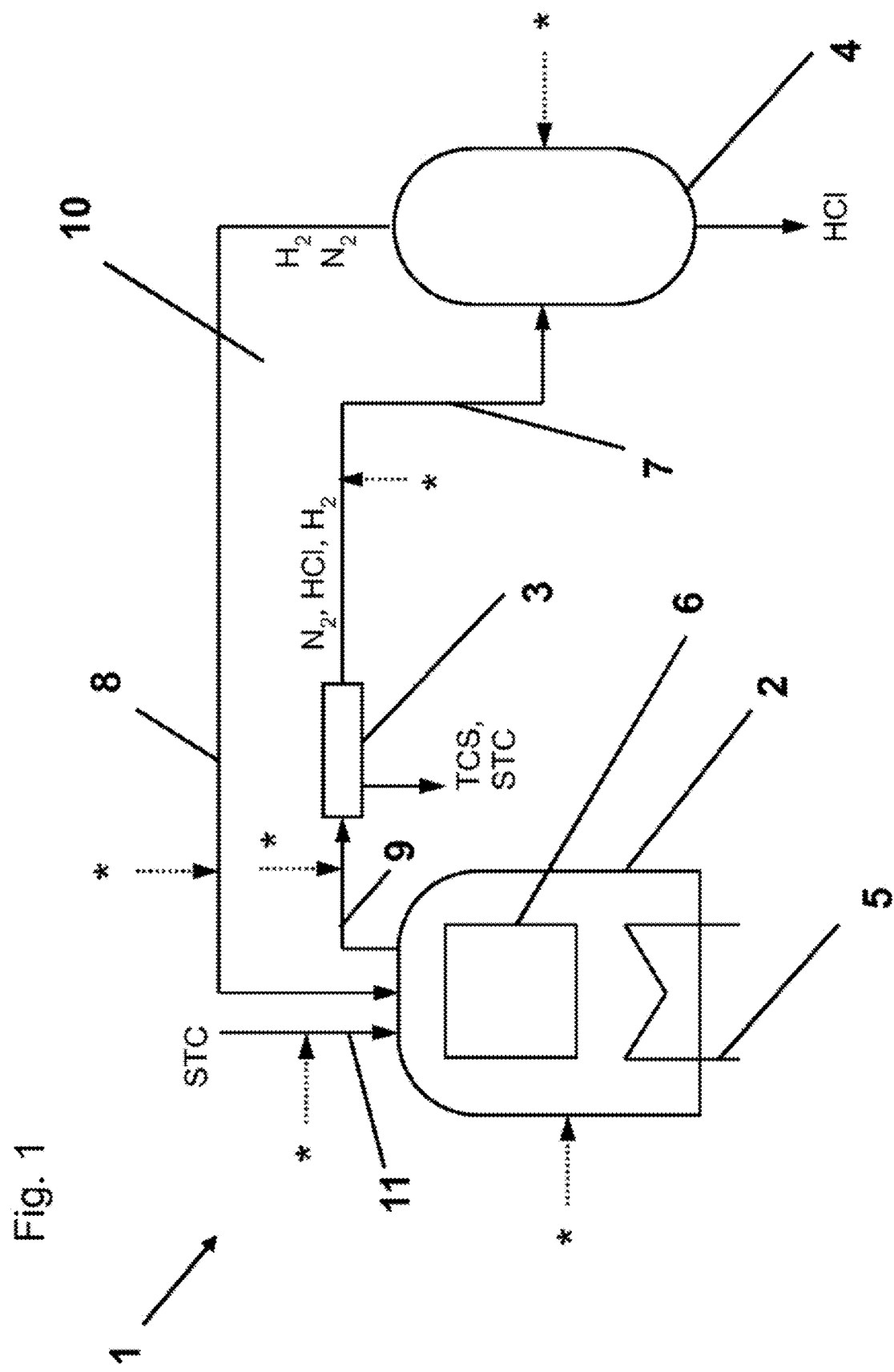
FIG. 1 illustrates an apparatus for carrying out the method of the invention.

The process is characterized in that a nitrogen compound is added in a molar proportion of from 0.1 to 10% based on hydrogen to the feed gas.

In a preferred embodiment, the nitrogen compound is added in a molar proportion of from 0.5 to 5%, preferably from 1 to 4%, particularly preferably from 1.5 to 3%, based on hydrogen.

The nitrogen compound is preferably gaseous (molecular) nitrogen ($N_2$).

It has surprisingly been found that strong passivation of hot graphite surfaces which are in contact with the feed gas occurs as a result of addition of the nitrogen compound to the feed gas. It is presumed that a kinetic inhibition of the methanation reaction occurs. The underlying mechanism has not yet been conclusively established.

It has been found that at temperatures above 850° C. molecular nitrogen in particular is not inert as described in the prior art, for example in WO 2013/116146 A1 and DE 10 2010 039 267 A1, and therefore also cannot be considered merely to be a component which reduces the space-time yield in the process (inert load).

In known processes for the hydrogenation or conversion of STC to form TCS, an introduction of nitrogen compounds, for example by flushing the reactor with nitrogen, is in principle avoided in order to reduce the inert load.

In the process of the invention, it is fundamentally necessary for the nitrogen compound to be present over the entire process time. The absence of nitrogen generally leads to the positive effect of passivation not occurring.

It has been found that the nitrogen compound in a molar proportion or 0.1-10% based on hydrogen does not lead to a significant reduction in the yield of TCS. The passivation of the hot graphite surface of the at least one heating element prolongs its life, increases the availability of the reactor and simplifies the reactor construction. The positive effect of the passivation is all the more apparent, the higher the process temperature or the temperature of the graphite surfaces which are in contact with the feed gas.

The passivation of the hot graphite surfaces increases with rising temperature. This can be observed by a decrease in the resistance of the heating elements with simultaneously increasing heating power and thus temperature. This is particularly advantageous. On the one hand, the reaction rate of methanation increases disproportionately with temperature and thus also the damage to the heating elements. On the other hand, however, the yield of TCS increases with increasing temperature since the chemical equilibrium is shifted in the direction of formation of TCS. Overall, the yield of TCS can be increased together with a simultaneous increase in the life of the heating elements. A corresponding situation applies to heat exchangers which have a graphite surface.

In principle, it is inconsequential whether the heating element consists of graphite or merely has a graphite surface. Preference is given to a heating element composed of graphite.

In one embodiment of the process, the temperature of the at least one heating element is from 850 to 1500° C., preferably from 900 to 1400° C., particularly preferably from 900 to 1300° C.

The temperature of the feed gas can be from 850 to 1500° C., preferably from 900 to 1400° C., particularly preferably from 900 to 1300° C.

The process is preferably carried out at a pressure in the range 2 to 18 bar, more preferably from 3 to 17 bar, particularly preferably from 4 to 16 bar, in particular from 5 to 15 bar. A process pressure of 2 bar here means that the process is carried out at a pressure which is 2 bar above standard atmospheric pressure (1.013 bar).

STC and hydrogen present in the feed gas are preferably present in a molar ratio of from 1:1.3 to 1:2.5, more preferably from 1:1.5 to 1:2.3, particularly preferably from 1:1.6 to 1:2.2.

In one embodiment of the process of the invention, the graphite surface of the at least one heating element is preferably coated with SiC.

In a further embodiment, a boron compound can also be added to the feed gas. The boron compound is preferably selected from the group consisting of diborane, higher boranes (e.g. $B_5H_9$, $B_5H_{11}$), boron halogen compounds (e.g. $BCl_3$, $B_2Cl_4$), borosilyl compounds (e.g. $Cl_2B$—$SiCl_3$) and mixtures thereof.

It has been found that the addition of a boron compound in addition to the add of a nitrogen compound, in particular molecular nitrogen, brings about a further improvement in the course of the resistance of the heating elements over time.

The boron compound and the nitrogen compound are preferably present in a molar ratio of from 1:100 to 1:10000, more preferably from 1:1000 to 1:5000.

Based on the amount of feed gas, the boron compound is preferably added in a molar proportion of from 0.1 to 100 ppmv (parts per million by volume), particularly preferably from 1 to 50 ppmv, in particular from 1 to 20 ppmv.

In a preferred embodiment of the process of the invention, the at least one heating element is preceded and/or followed by at least one heat exchanger. The heat exchanger preferably has a graphite surface. The heat exchanger can be, for example, a countercurrent heat exchanger and/or cross-flow heat exchanger. In particular, heat of a product gas containing TCS, hydrogen chloride and unreacted feed gas is transferred to the feed gas in the heat exchanger.

Preference is given to the nitrogen compound and/or boron compound to be fed together with hydrogen into the reactor. In particular, mixing of the two components takes place before entry into the reaction space.

Preference is also given to the nitrogen compound and/or the boron compound being fed together with STC into the reactor. Hereto, mixing of the two components preferably takes place before entry into the reaction space.

In addition, it can be preferred that the nitrogen compound and/or boron compound are fed both together with hydrogen and together with STC jointly into the reactor.

The concentration of the boron compound in the hydrogen or STC is preferably at least 0.1 ppmv.

The hydrogen used preferably already contains the nitrogen compound and/or the boron compound. The individual components can be taken from a joint reservoir. This dispenses with the necessity of a separate feed conduit and metering.

Particular preference is given to a nitrogen-containing stream of hydrogen.

Since the hydrogenation of STC does not display complete conversion because of kinetic effects and the chemical equilibrium, the process of the invention is preferably operated as recycle process. Here, the product can be separated off from the product gas and discharged. The unreacted starting materials STC and hydrogen can be recovered and fed as feed gas back into the reactor.

The use of a recycle process also results in the advantage that the amount of nitrogen compound added decreases only slightly during the course of the process. It is merely necessary to compensate for losses caused for example by discharge of feed streams or product streams from the process and nitrogen compound bound in liquid species or solids.

The process of the invention can, for example, be carried out in an apparatus as shown schematically in FIG. 1.

The apparatus 1 comprises a reactor 2 for hydrogenating STC, a condensation unit 3 for separating off TCS and unreacted STC and also a separation unit 4 for separating hydrogen ($H_2$), nitrogen ($N_2$) and hydrogen chloride (HCl). The reactor 2 comprises a resistance heating element 5 and a heat exchanger 6 and also a feed conduit 11 for STC, a feed conduit 8 for $N_2$ and $H_2$ and a discharge conduit 9 for product gas. Both the resistance heating element 5 and the heat exchanger 6 have a graphite surface. The reactor 2 can have a construction as described in U.S. Pat. No. 4,536,642 A.

The separation unit 4 connected by a conduit 7 to the condensation unit 3 forms, together with the feed conduit 8 and the discharge conduit 9, a recycle process 10 for working up product gas taken from the reactor 2. The product gas comprises unreacted $H_2$ and STC in addition to TCS and HCl.

The arrows denoted by an asterisk (*) represent possible feed conduits for the nitrogen compound, which is by way of example $N_2$.

To carry out the process, STC is fed via the feed conduit 11 into the reactor 2 and $H_2$ is fed via the feed conduit 8. The $N_2$ can in principle be introduced via any of the feed conduits denoted by an asterisk (*). However, in the present example an $N_2$-containing hydrogen stream which is, in particular, obtained at another place in an integrated plant and is utilized in the recycle process 10 is employed. Additional process safety devices and regulating devices, for example for precise metering, are avoided thereby and the costs are reduced. A further preferred method of introducing $N_2$ is the introduction of $N_2$ dissolved in STC. The solubility of $N_2$ in STC is determined by Henry's law.

Both the heat exchanger 6 and the resistance heating element 5 are arranged so that they are in direct contact with the gases STC, $H_2$ and $N_2$ fed in. The graphite surfaces of the resistance heating element 5 have a temperature in the range from 850 to 1600° C., and those of the heat exchanger 6 have a temperature in the range from 850 to 1600° C. The $N_2$ leads to passivation of the hot graphite surfaces. Methanation of the surfaces is prevented thereby and the wear experienced by heat exchanger 6 and resistance heating element 5 is slowed.

To achieve the passivating effect, the way in which the nitrogen compound, in particular the $N_2$, is introduced into the process is in principle inconsequential.

The product gas is discharged from the recycle process 10 via the discharge conduit 9. Firstly, the product TCS is largely separated off from unreacted STC in the product stream in the condensation unit 3, for example by condensation. The STC obtained can be fed to the reactor 2, for example via the feed conduit 11. The TCS obtained can, for example, be employed directly for the production of polysilicon.

The gas leaving the condensation unit 3 via the conduit 7 is fed to the separation unit 4. Here, HCl is separated off, for example by means of one or more absorption and desorption steps, with $H_2$ and $N_2$ being returned to the recycle process 10. A method for separating off HCl is disclosed in DE 31 39 705 A1.

The recycle process 10 results in the advantage that the amount of $N_2$ added decreases only slightly during the course of the process. It has been found that significant losses of $N_2$ occur exclusively via discharges during the process.

Samples of reactor internals based on carbon which have been examined using different analytical methods (infrared spectroscopy IR (attenuated total reflection (ATR) on diamond), scanning electron microscopy SEM, energy-dispersive X-ray spectroscopy EDX, X-ray diffraction XRD, elemental analysis) have confirmed this balancing relationship. Analyses of the offgas during the process of the invention have revealed no nitrogen species in the offgas from the reactor.

However, examination of carbon-based component surfaces does detect isolated nitrogen species. No nitrogen species could be detected by means of the abovementioned infrared-spectroscopic and X-ray-diffractometric measurement methods since these nitrogen species are apparently present in amounts below the respective detection limits. However, the existence of nitrogen could be detected in a few examined areas of the component surface by means of a combination of SEM/EDX analysis. Owing to the local limitation of this analytical method, it was, however, not possible to draw any conclusions in respect of the total component surface.

Traces of various nitrogen species could likewise be detected by means of time-of-flight secondary ion mass spectrometry (ToF-SIMS) (cf. Example 3). However, these nitrogen species are detectable only on the component and not in the product.

Overall it can be presumed from the detection of nitrogen or nitrogen species on the component surface that the nitrogen compound, in particular $N_2$, introduced is, due to formation of surface-specific bods, active in inhibiting the methanation reaction.

EXAMPLES

The examples were carried out in an apparatus as shown in FIG. 1. A feed gas containing 33 mol % of STC and 67 mol % of $H_2$ was used.

$N_2$ was added in an amount of from 0.1 to 5 mol % to the $H_2$ and the effects on the graphite surfaces (inhibition of the methanation reaction) was observed over a prolonged period of time.

Example 1

The following operating parameters were selected:
Molar ratio of STC:$H_2$=1:1.9
Reaction temperature=975° C.
Pressure=12 bar The arrangement of the resistance heating elements having a graphite surface was as has been described in DE 10 2011 077 967 A1. The temperature of the heating elements could be regulated or controlled either in pairs or in defined groups of the elements.

The electric resistance (R) can be calculated for the respective heating element from the electric current (I) and the electric potential (U) according to the general formula $$R = \frac{U}{I}.$$

The resistance served as indicator of damage to the heating element.

Is a significant increase in the resistance is found in a short time, damage to the heating element is also to be expected. Such damage leads to premature failure of the heating elements.

This method of observing the damage to heating elements has been described in DE 10 2012 218 741 A1.

Figure 2:
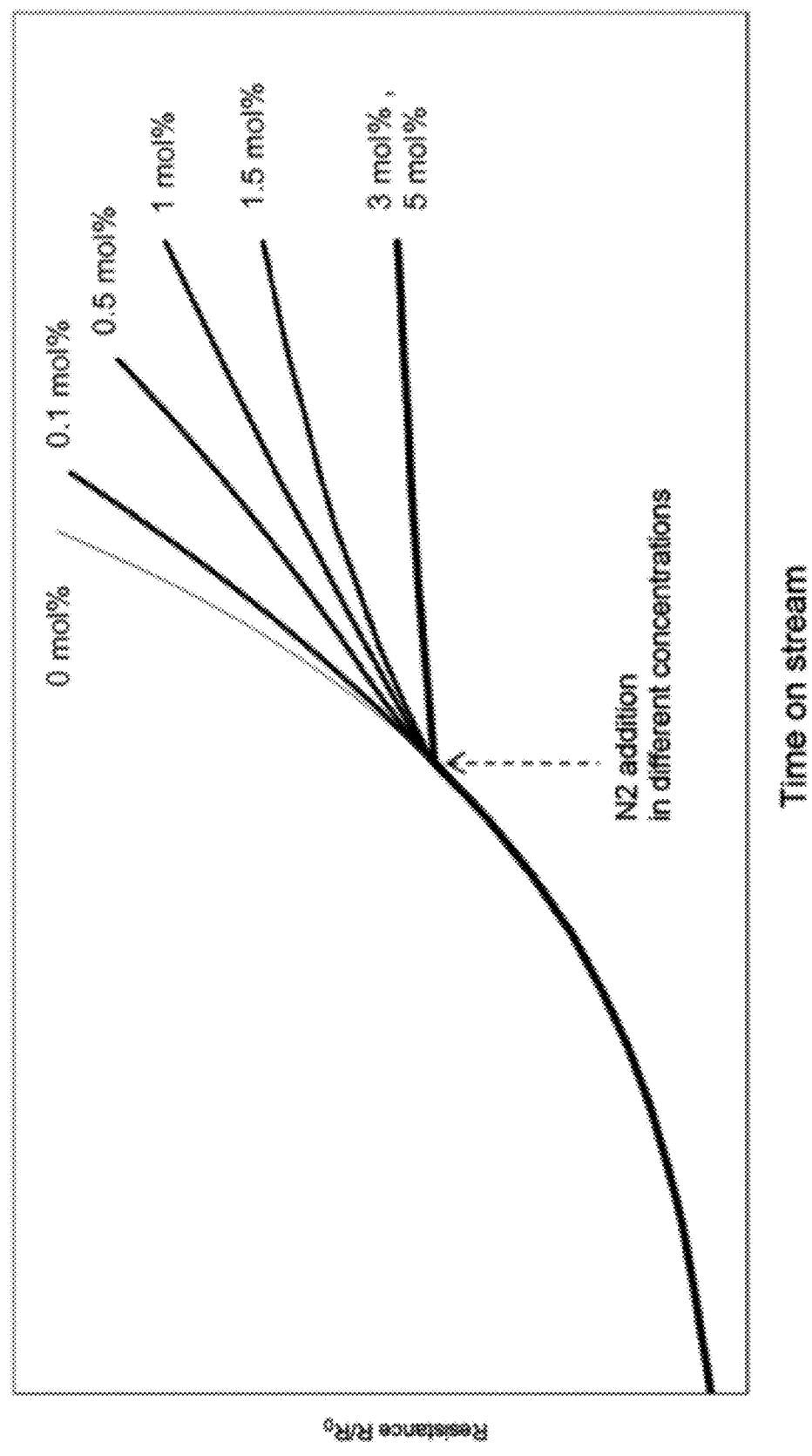
FIG. 2 illustrates the effect of $N_2$ on the electrical resistance of heating elements during the method of the invention.

FIG. 2 shows the course of the resistance of a heating element as a function of the time on stream for seven different $N_2$ concentrations (0 mol %, 0.1 mol %, 0.5 mol %, 1.0 mol %, 1.5 mol %, 3 mol %, 5 mol % in each case based on $H_2$). The addition of $N_2$ was carried out after a time on stream of 200 hours.

It can clearly be seen that the resistance curve flattens after addition of $N_2$. In other words, the resistance of the heating element increases to a lesser extent after the addition of $N_2$ to the feed gas than would have been the case in the absence of $N_2$. The increase in the resistance is reduced. This trend continues up to an $N_2$ concentration of 3 mol %. Above a concentration of >3 mol %, no further reduction in the resistance increase could be determined.

Figure 3:
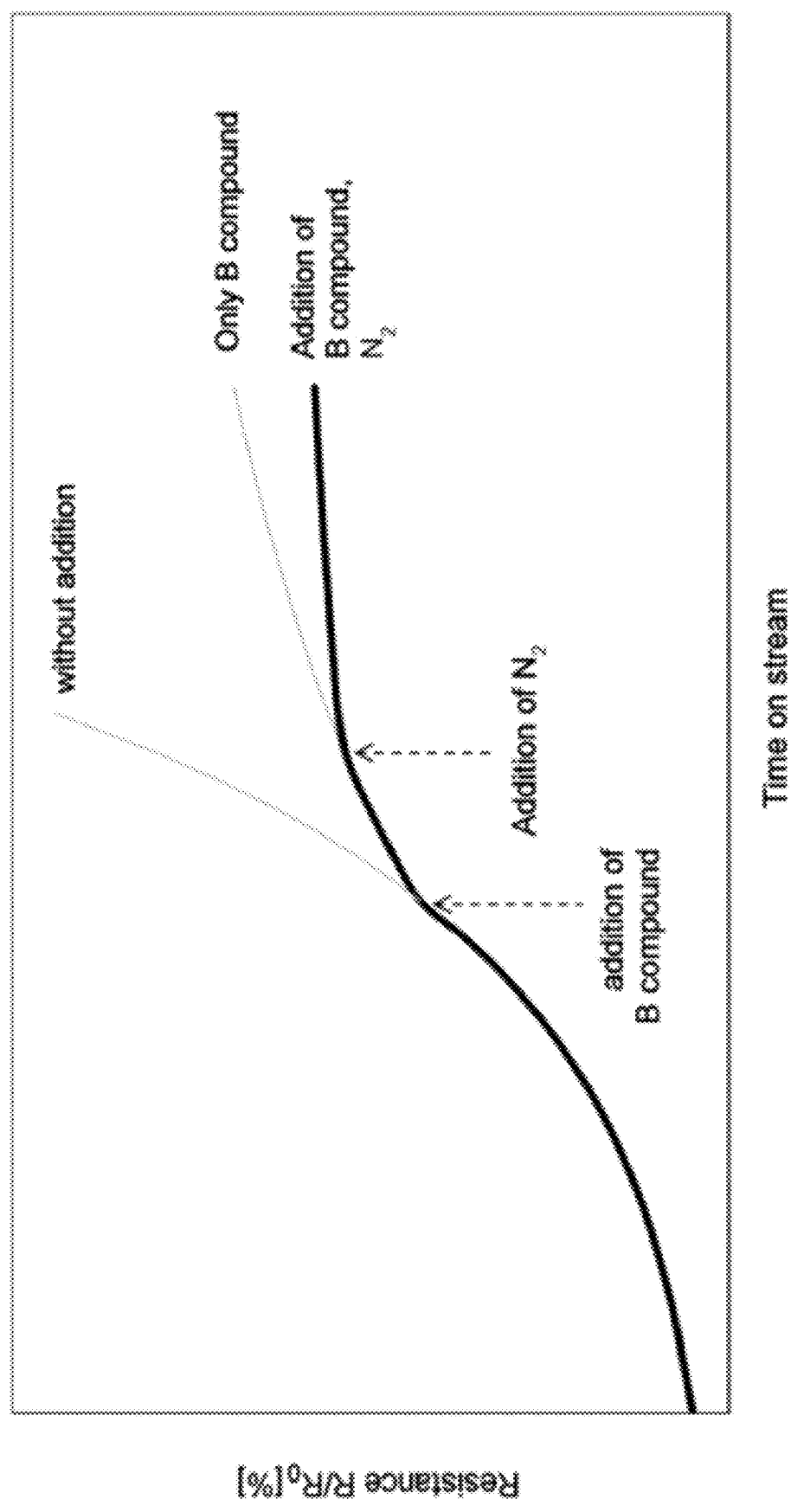
FIG. 3 illustrates the effect of a boron compound on the electrical resistance of heating elements during the method of the invention.

FIG. 3 shows the course of the resistance of a heating element as a function of the time on stream after a joint addition of diborane and $N_2$. Diborane was added to the feed gas at a constant concentration of 4 ppmv based on the total volume flow after a time on stream of 200 hours. Immediately afterward, a reduction in the increase in the resistance was observed. After a time of 300 hours, $N_2$ was added in a concentration of 1.5 mol % based on $H_2$. A further reduction in the resistance increase and thus a reduction in damage to the heating elements can clearly be seen. The positive effect can thus also be realized by addition of a boron compound and a nitrogen compound.

Example 2

The inhibition of the methanation reaction by addition of $N_2$ was tested over a period of one year on two apparatuses A and B for hydrogenation of STC. The two apparatuses each had a construction as shown in FIG. 1. Both apparatuses were operated under the same conditions. The only difference was the $N_2$ concentration in the feed gas.

The two apparatuses each comprised ten reactors having resistance heating elements, heat exchangers and further construction components composed of graphite which were all in contact with feed gas and/or product gas.

N$_2$ was introduced into the system via a nitrogen-containing stream of hydrogen. The nitrogen-containing stream of hydrogen was introduced into the recycle process 10 at the separation unit 4 to set the N$_2$ concentration in the feed gas (cf. FIG. 1).

The main operating parameters of the apparatus A and B were:
Molar ratio of STC:H$_2$=1:1.9
Reaction temperature=975° C.
Pressure=12 bar
Nitrogen concentration based on H$_2$:
Apparatus A: 0.2 mol %
Apparatus B: 1.5 mol %

It was found that over the course of a year significantly less damage to the elements having a graphite surface occurred in the case of apparatus B. Consequently, apparatus B was able to be operated significantly longer without replacement of the elements having a graphite surface. The annual production of TCS could be increased. The maintenance costs could be considerably reduced.

The presence of N$_2$ had no adverse effects, for example on the yield or the specific energy consumption of the apparatuses.

Figure 4:
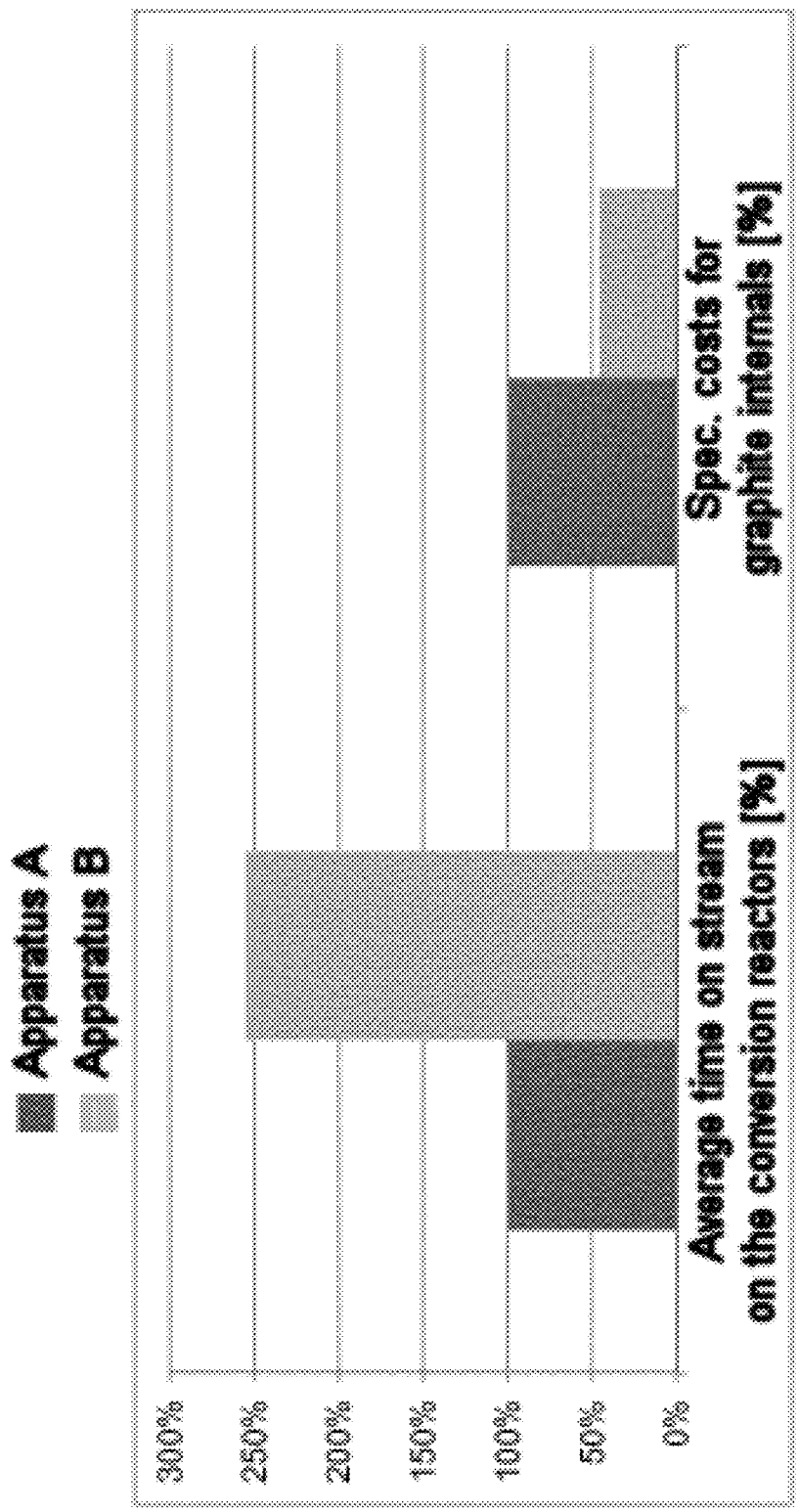
FIG. 4 illustrates the economic advantages of the method of the invention.

A comparison of the two apparatuses A and B in respect of time on stream and maintenance is shown in FIG. 4.

Example 3

The inhibition of the methanation reaction by addition of diborane and N$_2$ was tested over a period of about one year on one of the apparatuses as shown in FIG. 1.

The following operating parameters were selected:
Molar ratio of STC:H$_2$=1:1.9
Reaction temperature=975° C.
Pressure=12 bar Diborane was added to the feed gas in a constant concentration of 4 ppmv based on the total volume flow. N$_2$ was added in a concentration of 1.5 mol % based on H$_2$. Diborane and N$_2$ were introduced together at the commencement of operation. The time on stream of the reactor after the combined introduction was 350 days.

Figure 5:
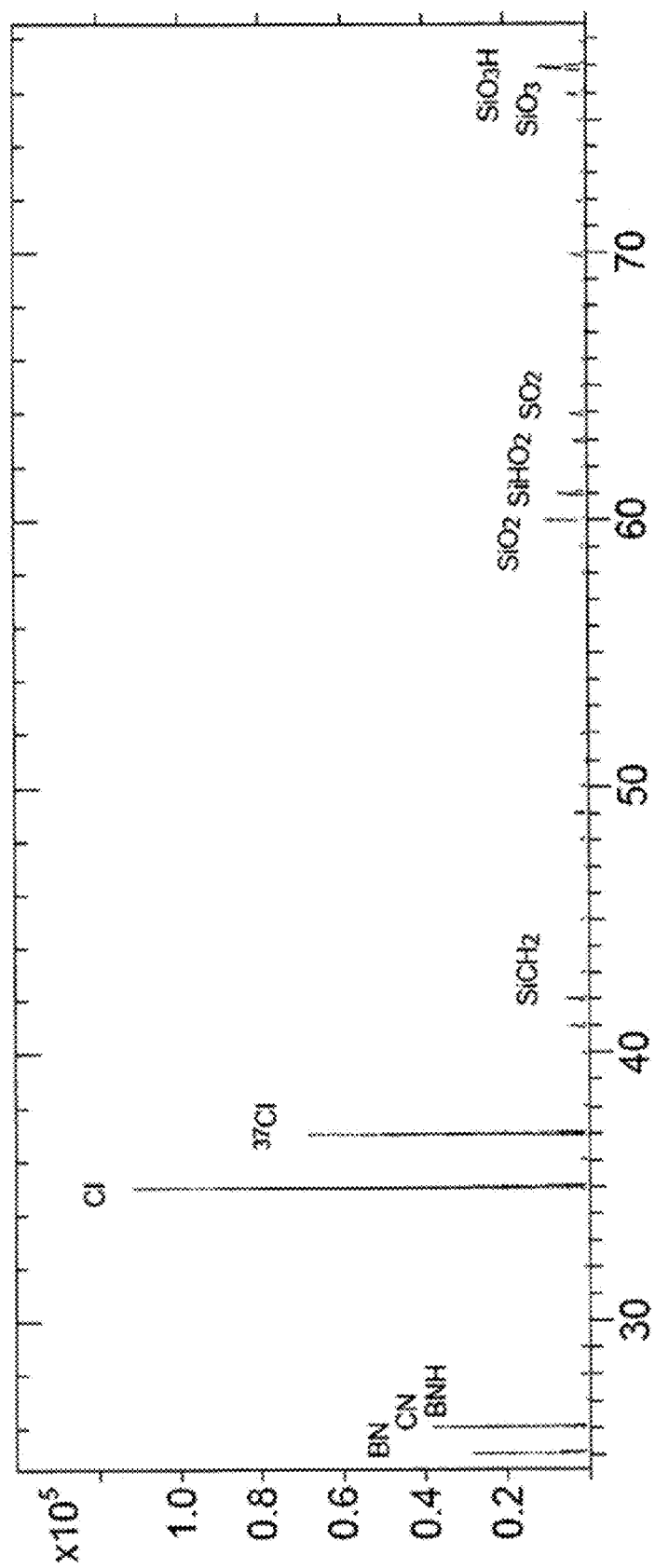
FIG. 5 is a graphical representation of a mass spectrum of a heating element surface.
Figure 6:
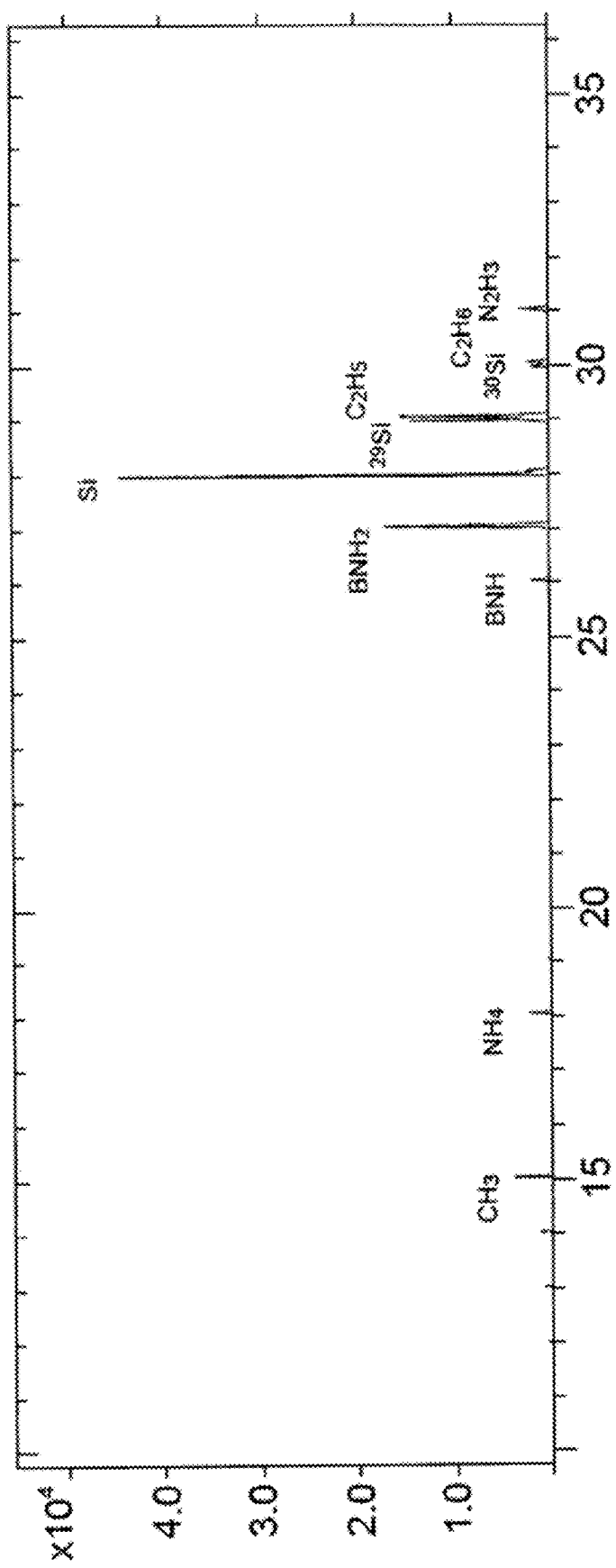
FIG. 6 is a graphical representation of a mass spectrum of a heating element surface.

After the apparatus was shut down, the resistance heating elements were taken out and prepared for analysis by means of ToF-SIMS (preparation of polished sections of the surface). Two mass spectra were recorded, and these are shown in FIGS. 5 and 6.

The yield or intensity (y-axis of the spectra) of the ablated or detached ions is significantly dependent on the total matrix which basically has to be calibrated beforehand for quantitative information. This calibration was not carried out in the measurement. For this reason, only qualitative conclusions can be drawn.

The ablated ions can have either a positive charge or a negative charge and are shown as a function of charge in separate spectra. To obtain an overall view of the sample surface, both the spectrum of the cations and also that of the anions have to be looked at.

The x axis of the spectra shows the unit m/z (mass per elementary charge).

FIG. 5 shows an extract of the anion spectrum in an x axis range of 25-80 m/z.

FIG. 6 shows an extract of the cation spectrum in an x axis range of 10-35 m/z.

Small traces of nitrogen-containing species can be seen in addition to clear chlorine, silicon and oxygen species both in the anion spectrum and in the cation spectrum of the ToF-SIMS analysis. As examples, mention may be made here of the (CN$^-$) and (BN$^-$) fragments at 25 and 26 m/z, respectively (cf. FIG. 5), and the (BNH$_2^+$) and (NH$_4^+$) fragments at 26 and 18 m/z, respectively (cf. FIG. 6).

Overall, it can be concluded from the detection of these nitrogen and boron species on the component surface that the introduced nitrogen and/or boron compound does not display inert behavior but is, due to formation of surface-specific bonds, actively involved in the inhibition of the methanation reaction.

In the case of an apparatus which was operated under comparable conditions but without combined addition of N$_2$ and diborane, replacement of the heating elements had to be carried out after only 160 days.

The invention claimed is:

1. A method for hydrogenating silicon tetrachloride in a reactor, comprising:
supplying a feed gas comprising hydrogen and silicon tetrachloride to a reactor and heating the feed gas to a temperature in the range from 850° C. to 1600° C. by employing at least one heating element comprising a graphite surface, the at least one heating element located within the reactor and in direct contact with the feed gas, the temperature of the heating element being in the range 850° C. to 1600° C., wherein nitrogen is added to the reactor in a molar proportion of from 0.1 to 10% based on hydrogen in the feed gas.

2. The method of claim 1, wherein nitrogen is added in a molar proportion of from 0.5 to 5% based on hydrogen.

3. The method of claim 1, wherein the temperature of the at least one heating element is from 850 to 1500° C.

4. The method of claim 1, wherein the temperature of the feed gas in the reactor is from 850 to 1500° C.

5. The method of claim 1, wherein the method is carried out at a pressure in the range from 2 to 18 bar.

6. The method of claim 1, wherein silicon tetrachloride and hydrogen are present in a molar ratio of from 1:1.3 to 1:2.5.

7. The method of claim 1, wherein the graphite surface of the at least one heating element is coated with silicon carbide.

8. The method of claim 1, wherein a boron compound is additionally present in the reactor.

9. The method of claim 8, wherein the boron compound is selected from the group consisting of diborane, higher boranes, boron-halogen compounds, borosilyl compounds and mixtures thereof.

10. The method of claim 9, wherein the boron compound is added to the reactor in a molar proportion of from 0.1 ppmv to 100 ppmv based on the amount of feed gas.

11. The method of claim 1, further comprising installing at least one heat exchanger comprising a graphite surface upstream and/or downstream of the at least one heating element.

12. The method of claim 1, wherein nitrogen is introduced together with hydrogen into the reactor.

13. The method of claim 1, wherein nitrogen is introduced together with silicon tetrachloride into the reactor.

14. The method of claim 1, wherein the hydrogen of the feed gas includes nitrogen.

15. The method of claim 1, wherein nitrogen is added in a molar proportion of from 1.5 to 3% based on hydrogen.

16. The method of claim 1, wherein the temperature of the at least one heating element is from 900 to 1300° C.

17. The method of claim 1, wherein the method is carried out at a pressure in the range from 4 to 16 bar.

18. The method of claim 1, wherein silicon tetrachloride and hydrogen are present in a molar ratio of from 1:1.6 to 1:2.2.

* * * * *